(No Model.)
J. R. MARKLE.
MECHANISM FOR DRIVING DYNAMO ELECTRIC MACHINES.
No. 305,943. Patented Sept. 30, 1884.
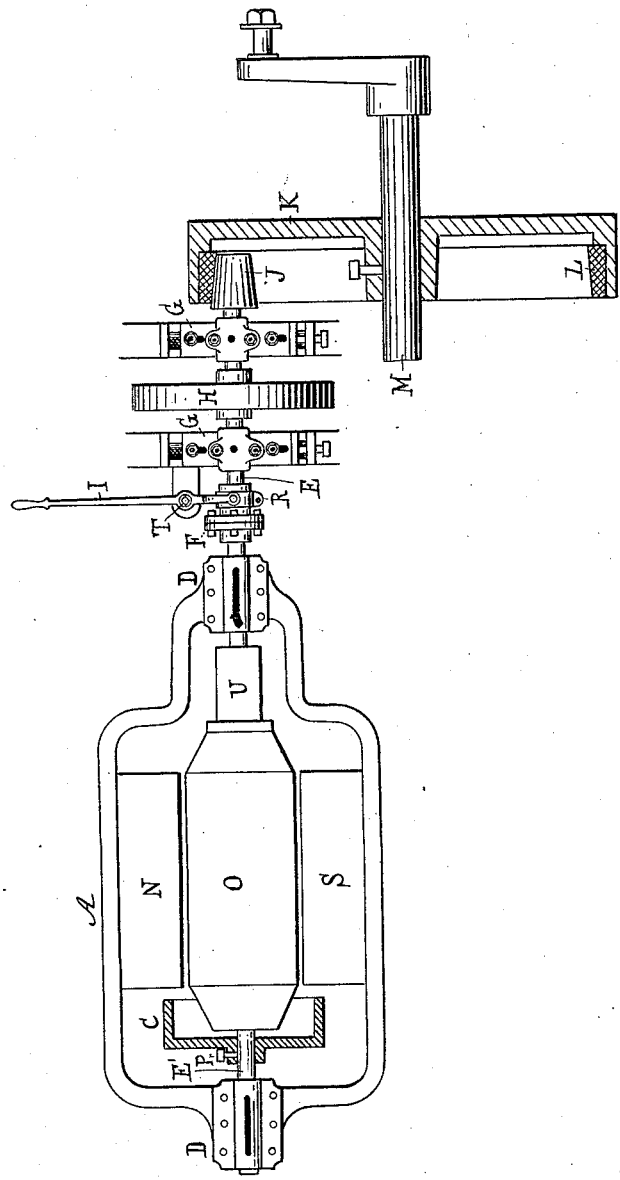
Witnesses:
A. Barthel
Sumner Collins
Inventor:
John R. Markle
by Geo H Lothrop
Atty.

UNITED STATES PATENT OFFICE.

JOHN R. MARKLE, OF DETROIT, MICHIGAN, ASSIGNOR TO WILLIAM K. ANDERSON, TRUSTEE, OF SAME PLACE.

MECHANISM FOR DRIVING DYNAMO-ELECTRIC MACHINES.

SPECIFICATION forming part of Letters Patent No. 305,943, dated September 30, 1884.

Application filed January 31, 1884. (No model.)

*To all whom it may concern:*

Be it known that I, JOHN R. MARKLE, of Detroit, in the county of Wayne and State of Michigan, have invented a new and useful Improvement in Mechanism for Driving Dynamo-Electric Machines, of which the following is a specification.

The drawing is a plan view, two of the pulleys being in section.

My invention consists in an improvement in mechanism for driving dynamo-electric machines, hereinafter fully pointed out.

A represents a dynamo-electric machine, N S representing the field-magnets; O, the armature; E', the armature-shaft; U, the commutator, and D D, the bearings in which the armature-shaft runs.

M represents the crank-shaft of a steam-engine, and K represents a friction-pulley secured to said shaft and turning with it. In the inner rim of pulley K is set a paper lining, L, to act as a friction-surface, the paper being beveled slightly toward the outer edge of the rim of said pulley, as shown in the drawing.

E represents a counter-shaft, on which is a fly-wheel, H, which is used for the purposes explained in a patent allowed to James B. Wayne and myself on the 3d day of January, 1884. The shaft E runs in bearings G G, which I prefer to make adjustable by set-screws, as shown, or in any known manner.

J represents a bevel friction-wheel, secured on the end of shaft E, and adapted to engage with the paper friction-lining L in pulley K, being beveled on the same angle as is said paper friction-lining.

I represents a forked lever, pivoted at T to the frame which supports shaft E, its forked end being pivoted to a loose collar running in a groove on said shaft.

F represents two coupling-disks—one on shaft E and the other on shaft E'—which are bolted together to connect said shafts.

C represents an iron pulley, which is adjustably fastened by a set-screw, P, to shaft E' at the other end of said shaft from the commutator U. I prefer to make this pulley with a flanged rim, as shown; but any pulley or a simple iron disk may be used. The shafts E E' are so set in the bearings that they may have a little end play. The shaft E must first be adjusted by moving the adjustable bearings G G until the friction-wheel J is brought into the proper position to engage with the paper friction-lining L, the dynamo so set that the armature shaft E' is in line with shaft E, and the coupling-disks F bolted together.

The operation of my invention is then as follows: The crank-shaft M being in motion, carrying with it the friction-pulley K, by means of lever I shafts E' E are forced toward pulley K until friction-wheel J comes in contact with the paper friction L, as shown in the drawing, and is rotated by pulley K. This sets the armature O in motion, as shaft E' must turn with shaft E, and the dynamo begins to generate a current of electricity. As the field-magnets N S become excited they attract pulley C, and tend to thrust shaft E' E toward pulley K, thus holding the friction-wheels in close contact, and rendering it unnecessary to hold lever I. The stronger the current generated by the dynamo the greater will be the attraction of the field-magnets upon pulley C, so that the force with which the friction mechanism is pressed together will vary proportionally with the work required of the dynamo. By means of the set-screw P pulley C may be moved toward or away from the magnets, as desired, to increase the attraction of the magnets thereon. To stop the dynamo, shaft E is moved by the lever I, so as to disengage the friction mechanism, the beveled faces of which facilitate this, and as soon as the dynamo stops the magnets no longer attract the pulley C, and the dynamo remains idle until again set in operation, as above described.

It is obvious that the shaft E may be dispensed with, and the friction-wheel J secured directly to the end of the armature-shaft E', and that such an arrangement will fully embody my invention. Where a single dynamo only is used, it may by this arrangement be placed on an extension of the engine-bed, thus making the engine and dynamo practically one machine.

What I claim as my invention, and desire to secure by Letters Patent, is—

1. In combination with a dynamo-electric machine having on its armature-shaft a pulley adapted to be attracted by the field-magnets, a friction-wheel rigidly connected with said armature-shaft and adapted to engage with friction mechanism driven by any suitable power when said shaft is moved longitudinally, substantially as shown and described.

2. The combination of armature-shaft E', having thereon pulley C, shaft E, fly-wheel H, bevel friction-wheel J, beveled friction-pulley K, and lever I, substantially as shown and described.

JOHN R. MARKLE.

Witnesses:
CYRUS E. LOTHROP,
SUMNER COLLINS.